April 9, 1929.  H. D. GEYER  1,708,219
RUBBER SPRING SHACKLE
Filed May 18, 1926.
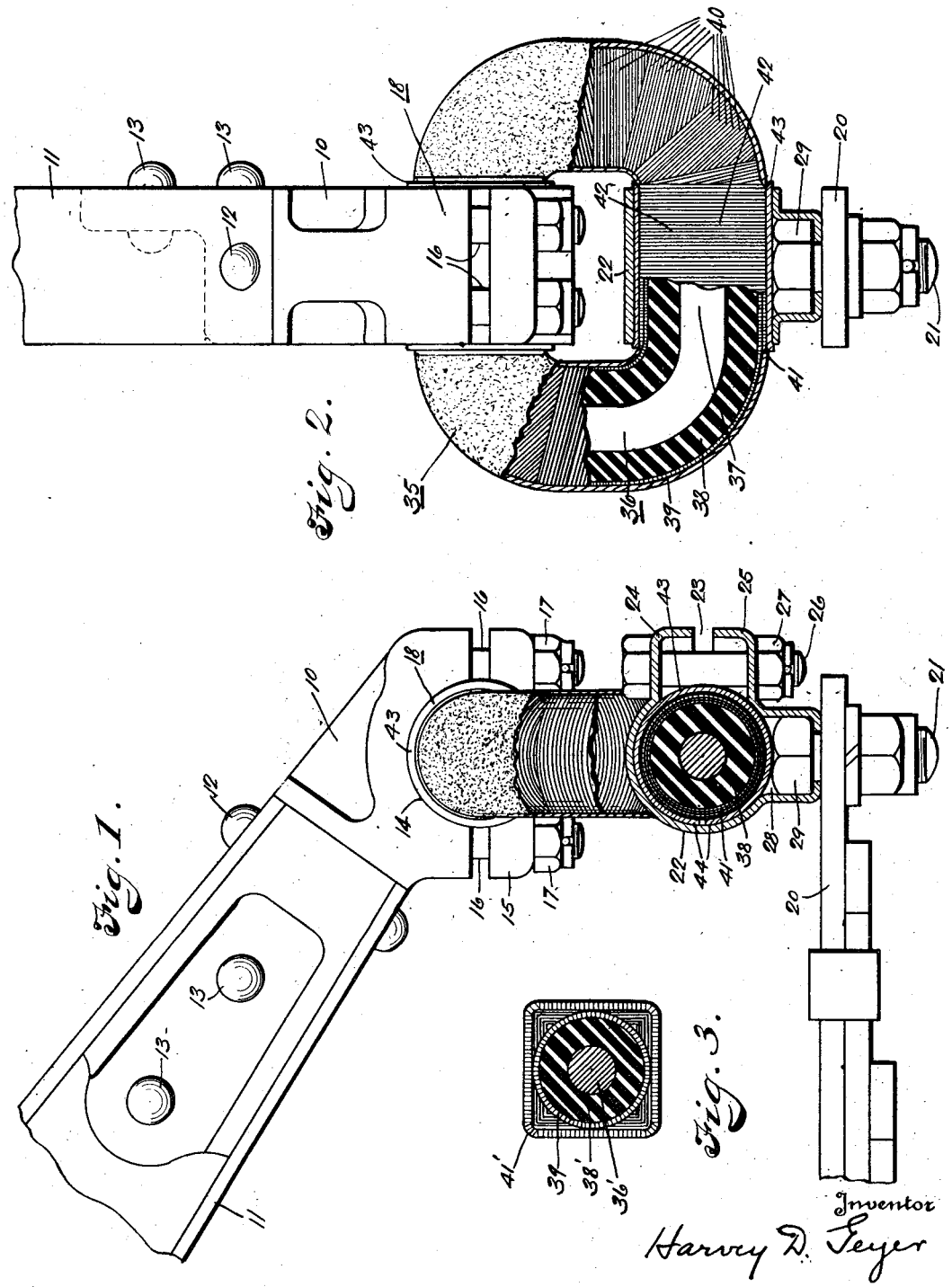

Patented Apr. 9, 1929.

1,708,219

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

RUBBER SPRING SHACKLE.

Application filed May 18, 1926. Serial No. 109,981.

This invention relates to coupling members, especially such as are used as spring shackles on vehicles.

An object of this invention is to provide an improved form of rubber spring shackle wherein all movement is taken by the internal distortion of the rubber members, thereby avoiding the necessity of lubrication and other disadvantages of ordinary metal shackles.

Another object is to provide a simple form of rubber spring shackle which is economical to manufacture yet efficient in operation, long-lasting, and neat in appearance.

Further objects and advantages of the present invention will be apparent from the following description, reference being had to the accompanying drawings, wherein a preferred form of embodiment of the present invention is clearly shown.

In the drawings:

Fig. 1 illustrates a shackle built according to this invention mounted on the rear end of the rear spring of an automobile chassis. Parts are broken away to show a section through the center line of the lower clamp or spring eye.

Fig. 2 is a rear end view of Fig. 1, with the spring eye shown in section and part of the molded member broken away to show the metal core.

Fig. 3 is a section through a modified form of the molded swinging member.

Similar reference characters refer to similar parts throughout the several views.

Numeral 10 designates the forging which is suitably fixed to the rear end of the chassis frame member 11 by the rivets 12 and 13. The forging 10 has a semi-cylindrical seat 14 therein, and a corresponding removable cap 15 is held thereupon by the studs 16 and nuts 17, thus completing the cylindrical bearing 18.

The long spring leaf 20 has bolted thereto by the bolt 21 an eye member 22 which corresponds in dimensions to the cylindrical bearing 18 of the frame member 11. This eye 22 is shown in the drawings as made from pressed metal, though of course it could be made in any other suitable manner if desired. The eye 22 is split at 23 so that the top portion 24 may be bent upwardly sufficiently to permit the ring-shaped molded member 35 to be inserted in place within the eye, after which the top portion 24 is bent down again and held clamped to the lower portion 25 by the two bolts 26 and nuts 27. The ears through which the bolts 26 extend are suitably stiffened by the upturned edges of the pressed metal, as clearly illustrated in Fig. 1. The eye 22 is provided on its under side with the drawn out recess 28 which encloses the large head 29 of the bolt 21, by which the eye is held fixed to the spring leaf 20.

The molded member 35 will now be described. An endless ring-shaped metal core 36, having two substantially straight portions 37 as shown in Fig. 2, has molded thereupon an endless soft rubber ring 38 corresponding in shape to the core 36. Before vulcanization of the rubber ring 38 it is provided with a strong pliable rubberized fabric casing 39 which preferably consists of rubberized cord tape of narrow width wrapped upon the rubber ring in such a manner that the cords 40 of the tape extend substantially directly around each portion of the rubber ring. This direction of the cords 40 is more or less diagrammatically shown in Fig. 2 of the drawings. This fabric casing 39 is preferably of increased thickness and stiffness, as shown at 41, where it passes through the cylindrical eyes 18 and 22. During vulcanization of the rubber ring in a suitable mold the fabric casing 39 is firmly vulcanized in place on the rubber and also the rubber is vulcanized to the metal core 37 so that it will firmly adhere thereto. The fabric casing 39 is preferably covered with a relatively thin layer of rubber which will protect the casing and give it a longer life.

This molded unit 35, preferably made as above described, has its upper substantially straight portion 42 clamped within the bearing 18 by means of the removable cap 15, and its lower opposed straight portion 42 clamped within the eye 22 by means of the bolts 26 and nuts 27. Preferably the collapsible sheet metal bushings 43 are slipped over these straight portions 42 before they are inserted in place in the bearing 18 and the eye 22 as described above. Then when the eye 22 is clamped upon the lower bushing 43 the spaced edges 44 thereof permit the bushing to collapse and be tightly clamped upon the molded member 35. The bushing 43 confines the molded member 35 throughout the straight portion 42 and prevents it from bulging out in the open space between the bolt lugs 24 and 25 (see Fig. 1). The upper bushing 43 similarly prevents the molded member 35 from bulging out in the open space between the cap 15 and the forging 10.

In operation, the portions 41 of the fabric casing 39 are held fixed within the bearing 18 and eye 22 when the metal core 36 swings to permit relative movement of the spring end 20 and the forging 10 fixed to the end of the frame member. The straight portions 37 of core 36 pivot substantially on the axes of bearings 18 and 22 by the internal twist of the rubber therearound. The pliable fabric casing 39 is distorted slightly by the swinging of the molded member 35 since the portions 42 of said casing are held fixed. The casing 39, being cylindrical in cross section and substantially nonstretchable, maintains the form of the molded rubber at all times and prevents it from bulging sharply around the ends of the metal bushings 43.

It is clear from the above description and drawings, that the core 36 has its opposite straight portions 37 pivotally mounted in the bearing 18 and eye 22 respectively, but that said core 36 is completely isolated by rubber from the bearing 18 and eye 22.

Fig. 3 illustrates a slightly modified form of the molded member, being a cross section through the straight portion of said member where it passes through the lower or upper square bearing corresponding to eye 22 and bearing 18. By making the cross section of the molded member 35 at these points square instead of round, as shown in Figs. 1 and 2, the portion 41' of the fabric casing may be more easily held clamped against rotation within the bearings. The remaining portions of the molded member 35 are preferably circular in section in this modified form. In forming the square section portions of member 35 the rubber 38' preferably remains circular in section and the square portion 41' is built up from rubberized fabric and molded into square form, as will be readily understood by those skilled in the art.

While the form of embodiment of the present invention as herein disclosed, constitutes a preferred form, it is to be understood that other forms might be adopted, all coming within the scope of the claims which follow.

What is claimed is as follows:

1. In combination with a spring and frame member of a vehicle, a shackle comprising: an endless metal core, a flexible rubber ring molded upon said core, means for fixing the periphery of one portion of said rubber ring to said frame member, means for fixing the periphery of the opposite portion of said rubber ring to said spring, whereby said metal core is pivotally mounted upon but isolated from both the spring and frame member.

2. In combination with a spring and frame member of a vehicle, a shackle comprising: an endless metal core having two opposed straight portions, a flexible rubber ring molded upon said core, means for fixing the periphery of one portion of said rubber ring to said frame member, means for fixing the periphery of the opposite portion of said rubber ring to said spring, whereby said metal core is pivotally mounted upon but isolated from both the spring and frame member.

3. In combination with a spring and frame member of a vehicle, a shackle comprising: an endless metal core, a flexible rubber ring molded upon said core, a pliable fibrous fabric casing molded upon said rubber ring, means for non-rotatably fixing the periphery of one portion of the molded unit to said frame member, and means for non-rotatably fixing the periphery of the opposite portion of said molded unit to the spring, whereby said metal core is pivotally mounted upon but isolated from both the spring and frame member.

4. In combination with a spring and frame member of a vehicle, a shackle comprising: an endless metal core, a flexible rubber ring molded upon said core, a pliable substantially non-stretchable casing molded upon said rubber ring, means for non-rotatably fixing the periphery of one portion of the molded unit to said frame member, and means for non-rotatably fixing the periphery of the opposite portion of said molded unit to the spring, whereby said metal core is pivotally mounted upon but isolated from both the spring and frame member.

5. In combination with a spring and frame member of a vehicle, a shackle comprising: an endless metal core, a flexible rubber ring, circular in section, molded upon said core, means for fixing the periphery of one portion of said rubber ring to said frame member, means for fixing the periphery of the opposite portion of said rubber ring to said spring, whereby said metal core is pivotally mounted upon but isolated from both the spring and frame member.

6. In combination with the spring and frame of a vehicle, a coupling comprising: an endless metal ring having two opposed straight portions, a molded soft rubber ring enclosing said metal ring, an eye member fixed to said frame, a second eye member fixed to said spring, said molded rubber unit having its two straight portions non-rotatably fixed in said two eye members respectively.

7. In combination with the spring and frame of a vehicle, a coupling comprising: an endless metal ring having two opposed straight portions, a molded soft rubber ring enclosing said metal ring, a pliable fabric casing molded upon said rubber ring, said casing comprising a plurality of rubberized cords wrapped about the rubber ring substantially circumferentially of each portion thereof, an eye member fixed to said frame, a second eye member fixed to said spring, said molded rubber unit having its two straight portions non-rotatably fixed in said two eye members respectively.

8. In combination with the spring and frame of a vehicle, a coupling comprising: an endless metal ring having two opposed straight portions, a molded soft rubber ring, circular in cross section, enclosing said metal ring, a pliable rubberized fabric casing molded upon said rubber ring, an eye member fixed to said frame, a second eye member fixed to said spring, said molded rubber unit having its two straight portions non-rotatably fixed in said two eye members respectively.

9. In combination with the spring and frame of a vehicle, a coupling comprising: an endless metal ring having two opposed straight portions, a molded soft rubber ring enclosing said metal ring, a pliable fabric casing molded upon said rubber ring, said casing comprising a plurality of rubberized cords wrapped about the rubber ring substantially circumferentially of each portion thereof, an eye member fixed to said frame, a second eye member fixed to said spring, said molded rubber unit having its two straight portions non-rotatably fixed in said two eye members respectively.

10. In combination with the spring and frame of a vehicle, a coupling comprising: an endless metal ring having two opposed and parallel straight portions, an elastic rubber bushing molded upon and enclosing each of said straight portions, a metal sleeve non-rotatably fixed upon the periphery of each of said rubber bushings, one of said metal sleeves being fixed to said frame and the other of said sleeves being fixed to said spring.

11. In combination with the spring and frame of a vehicle, a coupling comprising: an endless metal ring having two opposed and parallel straight portions, an elastic rubber bushing molded upon and enclosing each of said straight portions, clamping means for fixing the outer periphery of one of said rubber bushings to said frame, and a second clamping means for fixing the outer periphery of the opposed rubber bushing to said spring.

In testimony whereof I hereto affix my signature.

HARVEY D. GEYER.